(12) United States Patent
Franklin

(10) Patent No.: US 8,930,526 B2
(45) Date of Patent: Jan. 6, 2015

(54) PROCESSING NETWORK EVENTS

(75) Inventor: David Richard Franklin, London (GB)

(73) Assignee: International Business Machines Corporation, Armonk, NY (US)

(*) Notice: Subject to any disclaimer, the term of this patent is extended or adjusted under 35 U.S.C. 154(b) by 690 days.

(21) Appl. No.: 12/782,794

(22) Filed: May 19, 2010

(65) Prior Publication Data

US 2011/0106941 A1 May 5, 2011

(30) Foreign Application Priority Data

Oct. 30, 2009 (EP) .................................... 09174603

(51) Int. Cl.
*G06F 15/173* (2006.01)
*G06F 9/54* (2006.01)
*G06F 9/48* (2006.01)

(52) U.S. Cl.
CPC .............. *G06F 9/544* (2013.01); *G06F 9/4843* (2013.01); *G06F 9/541* (2013.01)
USPC ........................................................ 709/224

(58) Field of Classification Search
CPC . H04L 41/0631; H04L 41/0604; H04L 43/06; G06F 9/4843; G06F 9/541; G06F 9/544
See application file for complete search history.

(56) References Cited

U.S. PATENT DOCUMENTS

| | | | | |
|---|---|---|---|---|
| 5,588,150 | A | * | 12/1996 | Lin et al. ........................ 707/774 |
| 5,590,321 | A | * | 12/1996 | Lin et al. ............................... 1/1 |
| 6,278,696 | B1 | * | 8/2001 | Feldman et al. .............. 370/278 |
| 6,393,386 | B1 | * | 5/2002 | Zager et al. ...................... 703/25 |
| 6,421,701 | B1 | * | 7/2002 | Elnozahy ........................ 718/100 |
| 6,430,616 | B1 | * | 8/2002 | Brinnand et al. .............. 709/224 |
| 6,584,502 | B1 | * | 6/2003 | Natarajan et al. .............. 709/224 |
| 6,654,782 | B1 | * | 11/2003 | O'Brien et al. ................ 709/201 |
| 6,751,662 | B1 | * | 6/2004 | Natarajan et al. .............. 709/223 |
| 6,765,864 | B1 | * | 7/2004 | Natarajan et al. .............. 370/224 |
| 6,769,024 | B1 | * | 7/2004 | Natarajan et al. .............. 709/224 |
| 6,782,424 | B2 | * | 8/2004 | Yodaiken ....................... 709/224 |
| 7,284,048 | B2 | * | 10/2007 | Jakobson et al. .............. 709/224 |
| 7,376,733 | B2 | * | 5/2008 | Connelly et al. .............. 709/224 |
| 7,395,258 | B2 | * | 7/2008 | Altinel et al. .......................... 1/1 |
| 7,509,416 | B1 | * | 3/2009 | Edwardson et al. ........... 709/224 |
| 7,516,208 | B1 | * | 4/2009 | Kerrison et al. ............... 709/224 |
| 7,568,030 | B2 | * | 7/2009 | Banerjee et al. ............... 709/224 |
| 7,593,980 | B2 | * | 9/2009 | Marascio et al. .............. 709/201 |
| 7,673,335 | B1 | * | 3/2010 | Chakravarty et al. ............ 726/11 |

(Continued)

OTHER PUBLICATIONS

International Search Report and Written Opinion for PCT Application PCT/EP2010/062768 (filed Aug. 31, 2010), mailed Sep. 20, 2011, 14 pages.

(Continued)

*Primary Examiner* — Backhean Tiv
(74) *Attorney, Agent, or Firm* — VanLeeuwen & VanLeeuwen; William J. Stock

(57) ABSTRACT

Processing network events generates multiple events from a single network device event. The system includes a network monitoring device for acquiring event data and a processing system for receiving an input event from a network monitoring device on a processing thread, wherein the processing system includes a communications thread generating component for generating multiple communications threads each for transmitting event data to a server database. The communication threads open connections to required server databases and these connections are maintained in an open state while the network monitoring device is running.

32 Claims, 6 Drawing Sheets

(56) References Cited

U.S. PATENT DOCUMENTS

| | | | |
|---|---|---|---|
| 7,801,989 B2* | 9/2010 | Edwardson et al. | 709/224 |
| 7,925,665 B2* | 4/2011 | Schneider et al. | 707/774 |
| 7,965,620 B2* | 6/2011 | Gadgil et al. | 370/216 |
| 7,979,530 B1* | 7/2011 | Lee | 709/224 |
| 8,028,074 B2* | 9/2011 | Allen | 709/227 |
| 8,103,497 B1* | 1/2012 | Nemecek et al. | 703/28 |
| 2003/0014462 A1* | 1/2003 | Bennett et al. | 709/100 |
| 2004/0165610 A1* | 8/2004 | Chasin | 370/428 |
| 2004/0172467 A1* | 9/2004 | Wechter et al. | 709/224 |
| 2006/0075308 A1 | 4/2006 | Haselden et al. | 714/39 |
| 2006/0136351 A1* | 6/2006 | Angrish et al. | 707/1 |
| 2006/0190488 A1* | 8/2006 | Cohen et al. | 707/104.1 |
| 2007/0043861 A1* | 2/2007 | Baron et al. | 709/224 |
| 2007/0198471 A1* | 8/2007 | Schneider et al. | 707/3 |
| 2008/0021990 A1* | 1/2008 | Mansilla | 709/223 |
| 2008/0046557 A1* | 2/2008 | Cheng | 709/224 |
| 2008/0114873 A1* | 5/2008 | Chakravarty et al. | 709/224 |
| 2008/0126539 A1* | 5/2008 | Banerjee et al. | 709/224 |
| 2008/0127206 A1* | 5/2008 | Leonov et al. | 719/313 |
| 2008/0215580 A1* | 9/2008 | Altinel et al. | 707/5 |
| 2009/0077036 A1* | 3/2009 | Bent et al. | 707/3 |
| 2009/0204709 A1* | 8/2009 | Yodaiken | 709/224 |
| 2009/0327199 A1* | 12/2009 | Weber et al. | 706/48 |
| 2010/0174696 A1* | 7/2010 | Dixon et al. | 707/705 |
| 2011/0029595 A1* | 2/2011 | Thayer et al. | 709/203 |
| 2011/0055138 A1* | 3/2011 | Khanduja et al. | 706/47 |
| 2011/0131318 A1* | 6/2011 | Maes | 709/224 |

OTHER PUBLICATIONS

"Netcool/OMNIbus v7.1 Probe and Gateway Guide," Micromuse Inc., Jul. 2006, 186 pages, (International Searching Authority cites Chapters 1-2, pp. 1-74, section1.1 "probe overview," p. 30, figure 1, section 1.4 "Probe architecture," p. 33, paragraph "Sending Alerts to alternate objectServers and table," pp. 65-66, p. 32, lines 1-2).

* cited by examiner

PROCESSING NETWORK EVENTS

RELATED APPLICATIONS

This application is based on and claims the benefit of priority from European Patent Application EP 09174603.2, filed Oct. 30, 2009.

BACKGROUND

This invention relates to the field of event management. In particular, the invention relates to multiple event generation from a single network device event.

Network management involves gathering data from a range of devices in a network. Some implementations may use a large variety of monitoring devices such as probes or agents to perform this task which can provide a large amount of source data from many types of network devices and systems. If this data is sent to a central database without pre-processing and filtering then processing it within the central database can result in a high computational overhead and severely impact the overall performance of the system.

In other network management implementations, pre-processing may be performed using a rules configuration file that allows the network administrator to manipulate, augment and discard incoming event data using a range of logical operations. However, the output from these operations is limited to the generation of a single event that can only be sent on to a single table in a particular central server database.

In order to manage increasingly large amounts of network data more complex structures of server databases have been combined in order to distribute the computing overhead.

In some monitoring devices, event data may be received from multiple input threads, and a single thread may be used to process this data using the rules file to send it to the server database.

BRIEF SUMMARY

According to one embodiment of the present invention there is provided a method for processing network events, including receiving an input network event from a monitoring device on a processing thread, generating multiple data outputs from the network event, and generating multiple communications threads each for transmitting the multiple data outputs to one of multiple server databases.

In an embodiment of the invention, a processing thread may receive an input event and may process rules files for the input event including a generate event command to create a new communication thread. A communications thread may marshal and transmit event data to a server database. The communication threads may open connections to required server databases and these connections may be maintained in an open state while a monitoring device is running.

In an embodiment of the invention, the method may include processing a rules file to find instances of registered targets, and determining required server database connections. The server databases may include one or more tables for event data with a single communications thread for each server database.

Inter-thread communication may be asynchronous via message queues. In an embodiment, the method may include transferring event data via an inter-thread data structure.

In an embodiment of the invention, the method may include sending flush commands from the processing thread to clear the communications threads.

In an embodiment of the invention, the method may also include parsing event data to generate multiple data outputs.

In an embodiment of the invention, the method may include processing rules files for an input event and transferring data via a pointer to a communications thread when a generate event command is reached.

The event data may be passed to a communication thread as target and column data and converted into structured query language (SQL) and appended to a text memory allocation for transmission.

According to another embodiment of the present invention there is provided a computer software product for processing network events, the product including a computer-readable storage medium, storing a computer in which a program including computer-executable instructions are stored, which instructions, when executed by a computer, perform receiving an input network event from a monitoring device on a processing thread, generating multiple data outputs from the network event, and generating multiple communications threads each for transmitting the multiple data outputs to one of multiple server databases.

According to another embodiment of the present invention there is provided a system for processing network events, including a network monitoring device for acquiring network event data, a processing system for receiving an input event from a monitoring device on a processing thread, where the processing system includes a communications thread generating component for generating multiple communications threads each for transmitting event data to a server database.

In an embodiment of the invention, the processing system may include a receiver for an input event and rules files for the input event including a generate event command to create a new communication thread.

In an embodiment of the invention, the system may include a rules file for processing to find instances of registered targets, and a component for determining required server database connections.

The server databases may include one or more tables for event data with a single communications thread for each server database.

Inter-thread communication may be asynchronous via message queues and an inter-thread data structure may be provided for transferring event data.

In an embodiment of the invention, the system may include a component for flushing the communications threads.

In an embodiment of the invention, the system may also include a parsing component for parsing event data to generate multiple data outputs.

The communication thread may include a converter for converting event data into structured query language (SQL) and appending it to a text memory allocation for transmission.

In an embodiment of the invention, the processing system may run on multiple processors enabling the processing thread and communications threads to be executed simultaneously.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

DETAILED DESCRIPTION

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 1:
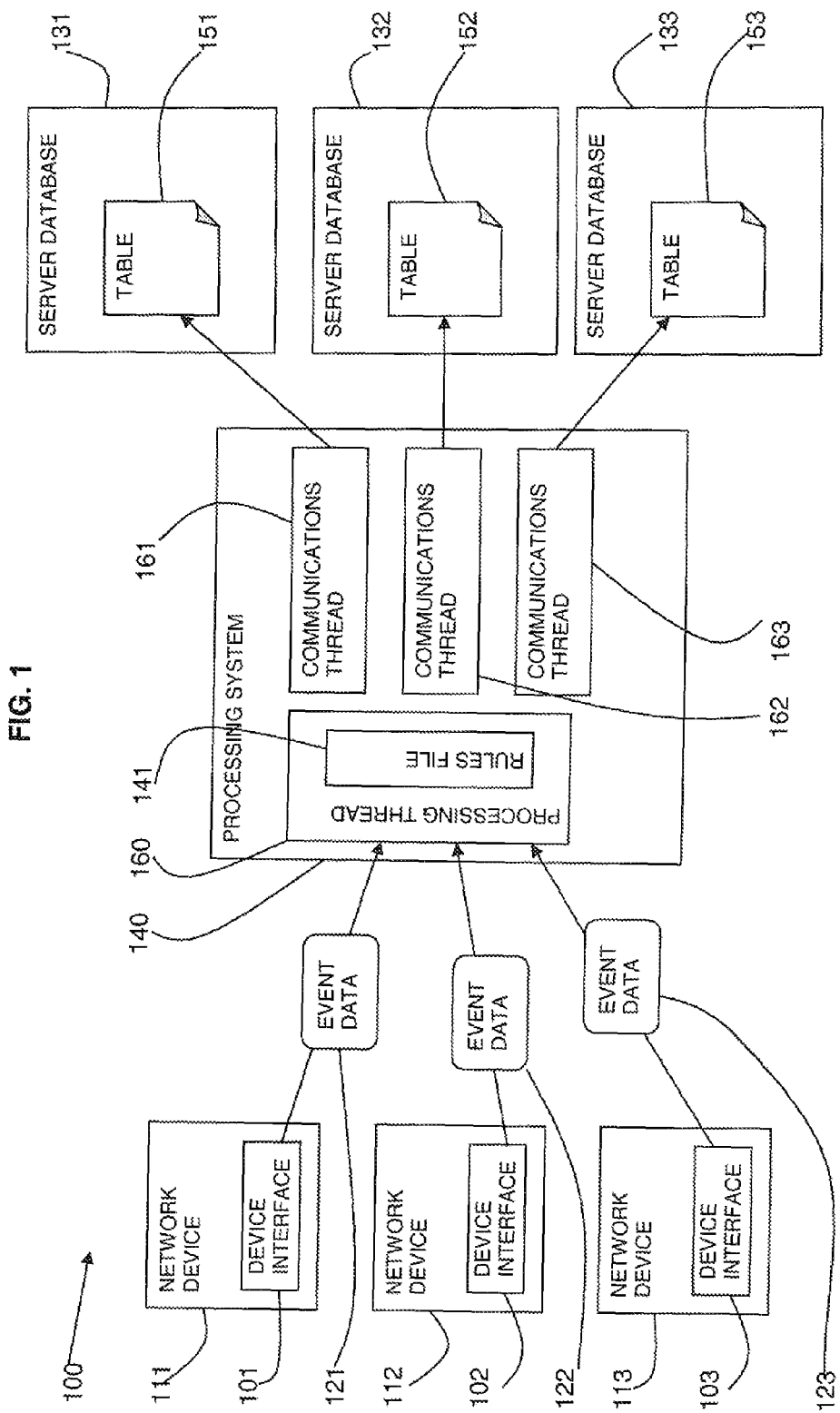
FIG. 1 is a block diagram of an event management system according to an embodiment of the present invention.

Referring to FIG. 1, an event management system 100, according to an embodiment of the invention, is shown for network management. The system 100 includes one or more monitoring devices such as probes or agents which each connect via a device interface 101-103 to an event source 111-113 such as network devices, to detect and acquire event data, and forward the event data 121-123 for processing. The monitoring devices may work remotely or directly monitoring events on network devices. The event data 121-123 is destined for one or more server databases 131-133 as alerts or faults. A processing system 140 is provided for converting and manipulating event data 121-123 before forwarding to server databases 131-133 as alerts or faults.

For example, the event management system may be in the form of IBM Tivoli Netcool/OMNIbus (IBM, Tivoli, Netcool/OMNIbus are trade marks of International Business Machines Corporation) service level management system with Netcool OMNIbus probes for collecting event data for sending as alerts to ObjectServers. Other event management systems are provided by Hewlett Packard Company, CA Inc. and BMC Software, Inc. in which agents monitor network devices directly or remotely.

The described processing system 140 includes a rules file 141 and includes a command that can be used to generate additional events in response to a single incoming data event 121-123. This command can be fully integrated with existing logical processing and manipulation of incoming data for maximum configuration flexibility. This gives an administrator the ability to send different event data 121-123 to multiple tables 151-153 that can reside on multiple server databases 131-133 in response to a single incoming data event 121.

The processing system 140 handles rules file processing and server database communication by separate operating system threads. The rules file processing is handled by a rules file processing thread 160. Communication with each separate server database 131-133 target defined in the rules file is handled by a separate communications thread 161-163.

Once parsed through the rules file, event data 121-123 is placed on an appropriate data queue for a given server database 131 that is read by the appropriate communications thread 161 for that server 131. The communication thread 161 converts the incoming data into structured query language (SQL) and sends it to the server database 131 using server middleware.

This means that in one embodiment of the invention, on a multiprocessor core host machine, rules file processing can be performed at the same time as data is marshalled and sent to one or more server databases. When under high data loads this can significantly improve performance.

Figure 2:
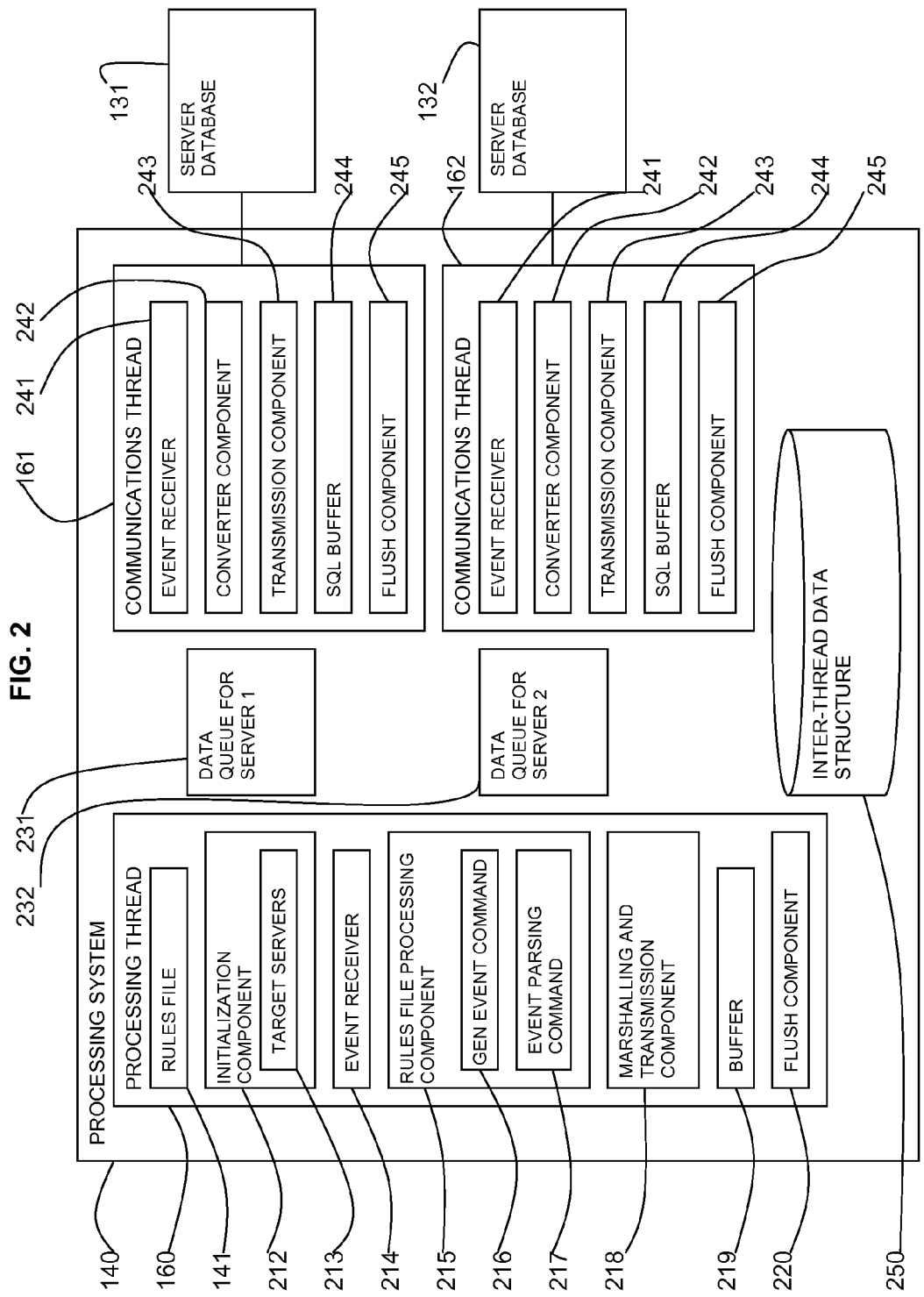
FIG. 2 is a block diagram of a thread processing system according to an embodiment of the present invention.

Referring to FIG. 2, a block diagram shows a processing system 140 in more detail according to an embodiment of the invention. The processing system 140 includes a rules file processing thread 160 and multiple generated communications threads 161, 162.

The rules file processing thread 160 includes a rules file 141. The rules file processing thread 160 includes an initialization component 212 which performs pre-processing to read the rules file 141 and convert it into machine processable form to result in a sequence of statement lists that are worked through when an event is received. The initialization component 212 also creates a list of target servers 213. The initialization component 212 spawns the communications threads 161, 162 for each target server and creates data or message queues 231, 232 between the rules file processing thread 160 and each of the communications threads 161, 162.

An event receiver 214 receives incoming event data. A rules file processing component 215 processes the incoming event data. The rules file processing component 215 includes an event generation command component 216 and an event parsing command component 217.

A marshalling and transmission component 218 sends parsed events to a buffer 219 for transmission. A flush component 220 is provided to flush previous events.

An inter-thread data structure 250 is provided to avoid large amounts of data being passed over the message queues 231, 232. Memory is allocated in the data structure 250 by marshalling the space to store the event data. A pointer to this data is then placed on a message queue 231, 232 and sent to the communications thread 161, 162. The communications thread 161, 162 then frees the memory after it has been converted into SQL.

The rules file processing thread 160 includes an event parsing command component 217 for generating multiple data outputs from a single event for inputting in multiple databases or tables.

The data from the incoming event is processed using the logical operators in the rules file 141 which are used to populate fields in the output events. For example, an incoming event has data A (a string), B (an int), and C (an int). A generated event might be output with 3 fields (B+1, A+"-this is the summary", B−C). The main event might then be output with just 2 fields (A+"-Main event", B). In this example, target tables in the target servers 151, 152 have the fields with the same types as the data being sent out. So the output events are constructed from the incoming event data according to the logic encoded in the rules file 141.

The communication threads 161, 162 each include: an event receiver 241, a SQL converter component 242, a server database transmission component 243, an SQL buffer 244, and a flush component 245. A connection is established to a target server 131,132 and an empty SQL buffer 244 is created. An event receiver 241 receives events from the rules file processing thread 160 and processes it and transmits it to the target server 131, 132. Flush messages are received from the rules file processing thread 160 and the flush component 245 handles these and sends a flush acknowledgment back.

A generate event command is provided in the rules file 141 syntax. The generate event command provides the ability to send events to more than one table. These tables may reside on different server databases 131, 132. The target table is registered using a register target rules file command. When the register target command is called with a corresponding details table, the generate event command also inserts the details information, if any details information is specified, in the rules file 141.

The processing of event data from a monitoring device is performed in order to maintain the event throughput rate of the monitoring device. The generate event command 216 enables insert operations to be carried out on multiple server databases 131-132. Communication is spawned to separate threads 161, 162 for each server 131-132 that will receive data. Therefore, a monitoring device will function in a multithreaded form by default. There is a main event receiving and rules file processing thread 160 and one or more communication threads 161-162 for marshalling and transmission. The communication threads 161-162 open connections to the servers 131-132 and the connections are maintained in an open state while the monitoring device is running.

Figure 3:
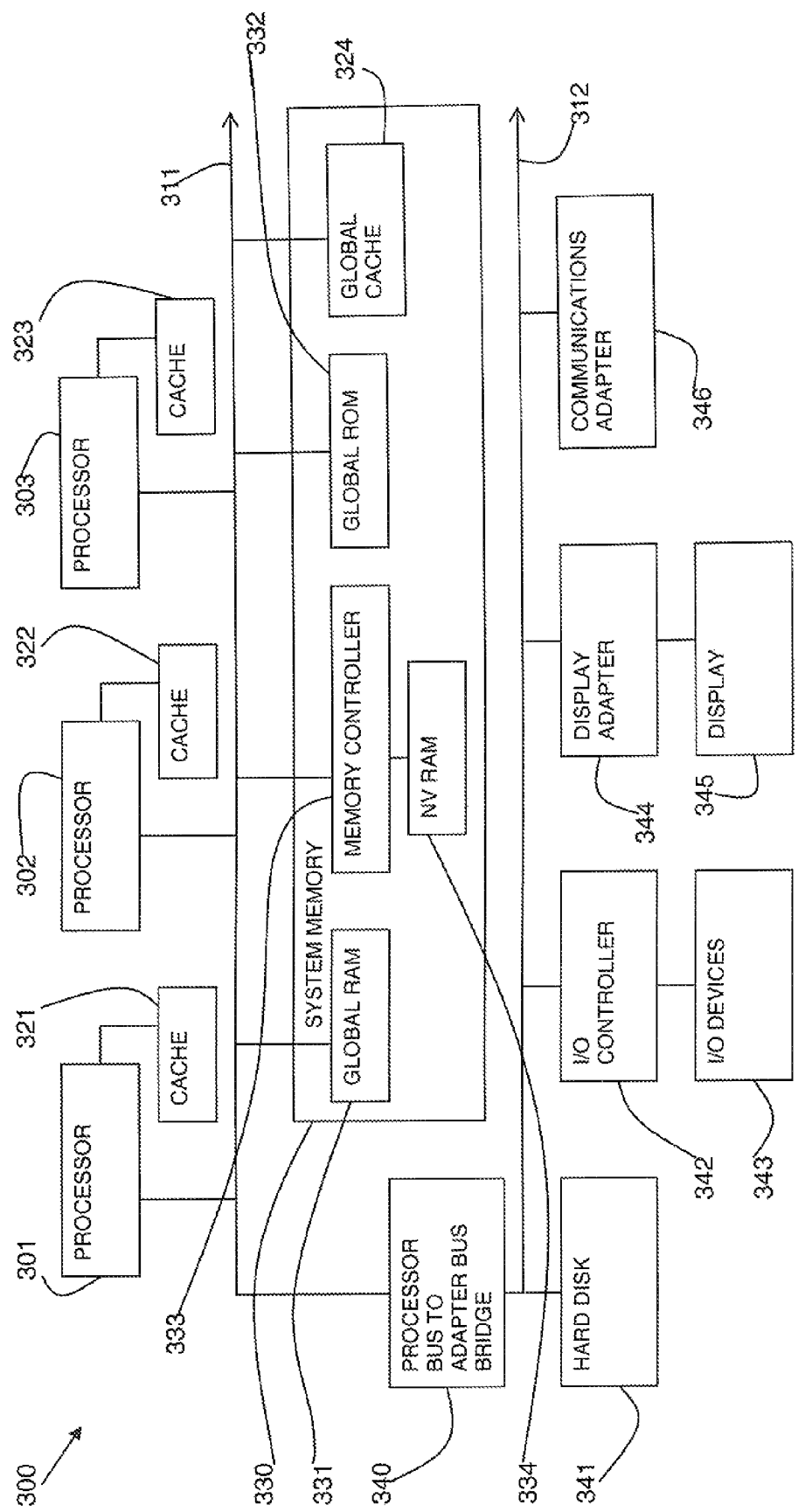
FIG. 3 is a block diagram of a computer system in which an embodiment of the present invention may be implemented.

Referring to FIG. 3, an exemplary system, according to an embodiment of the invention, is shown including a data processing system 300 suitable for storing and/or executing program code including at least one processor 301-303 coupled directly or indirectly to memory elements through one or more bus systems 311, 312. Multiple processors and communications bus systems can be provided in a system for parallel processing.

Each of the processors 301-303 may include its own cache 321-323; alternatively, a global cache 324 may be used.

The memory elements can include local memory employed during actual execution of the program code, bulk storage, and cache memories which provide temporary storage of at least some program code in order to reduce the number of times code must be retrieved from bulk storage during execution.

The processors 301-303 communicate with each other and with system memory 330 across a high speed system bus 311. System memory 330 includes a global random access memory (RAM) 331, a global read only memory (ROM) 332, a memory controller 333, and a non-volatile RAM (NVRAM) 334.

The global RAM 331 is volatile memory used by each of the processors to store data and instructions for later access as desired. The global ROM 332 is non-volatile memory that includes data and instructions stored in the system. NVRAM 334 is non-volatile RAM that can be modified by the processors and includes boot code.

Also attached to the system bus 311 is processor bus to adapter bus bridge 340. This bus bridge allows multiple devices to communicate with each of the processors 301-303 and/or system memory 330 across adapter bus 312.

Coupled to the adapter bus 312 is a hard disk 341 for storing large amounts of data and instructions, such as operating systems and multiple software applications. An I/O controller 342 is also coupled to the adapter bus 312 and is used for handling communications with attached or external I/O devices 343, such as a keyboard, mouse, removable media, etc.

A display adapter 344 may also be coupled to adapter bus 312 for displaying data on a display 345. In addition, a communications adapter 346 may be attached to adapter bus 312 for communicating data across a network.

Figure 4:
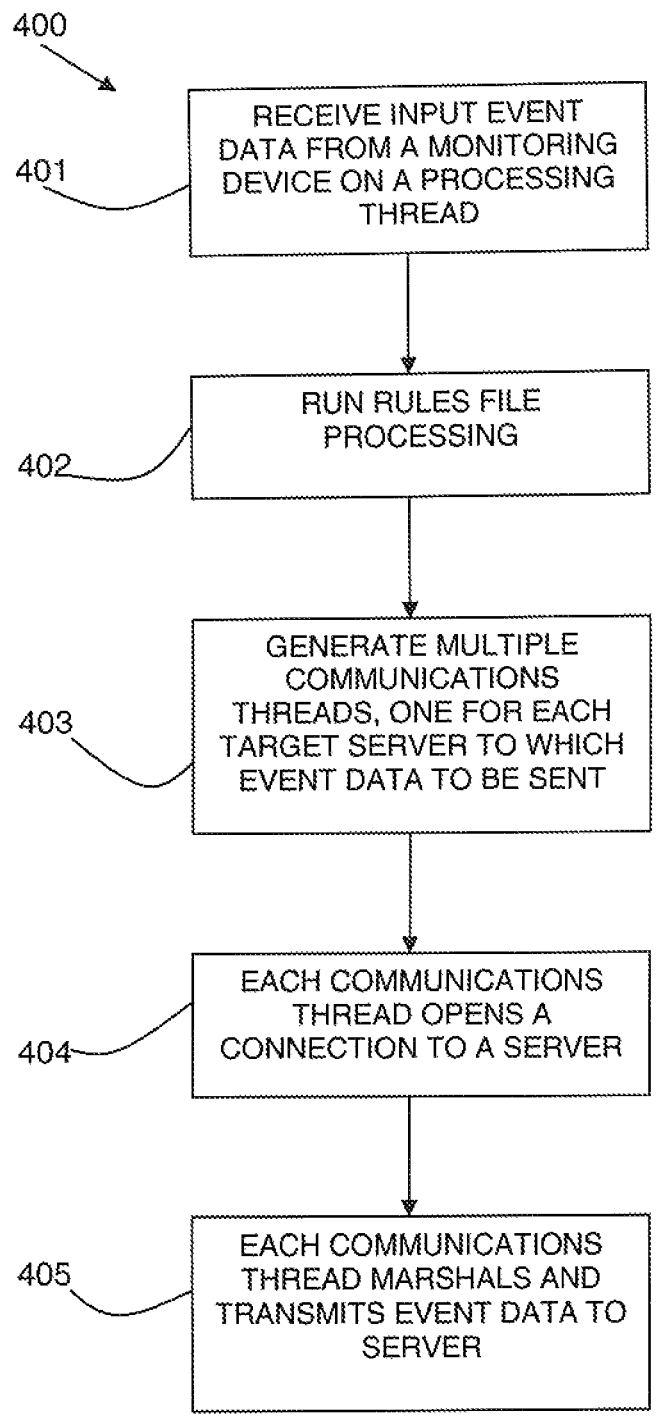
FIG. 4 is a flow diagram of a method of thread processing according to an embodiment of the present invention.

FIG. 4 shows a flow diagram 400 of the method of multiple event generation, according to an embodiment of the invention. An input event is received 401 from a network monitoring device on a processing thread. The rules file processing is run 402 and multiple communications threads are generated 403, typically one for each target server to which event data is to be sent.

Each communications thread opens 404 a connection to a server and marshals and transmits 405 event data to the server.

Figure 5:
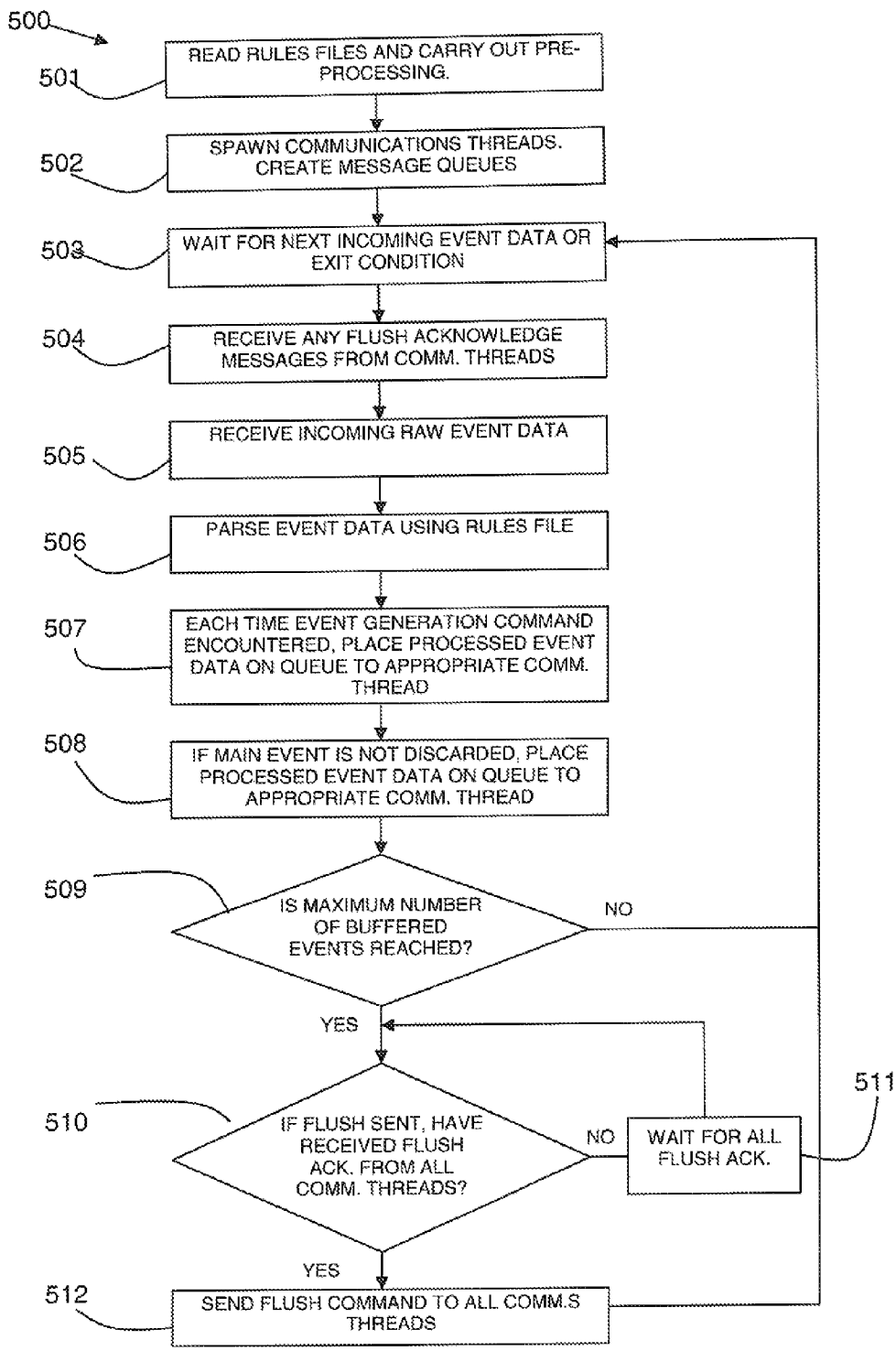
FIG. 5 is a flow diagram of a method of thread processing at a rules file processing thread according to an embodiment of the present invention.

FIG. 5 shows a flow diagram 500 of a method at a rules file processing thread, according to an embodiment of the invention. Rules files are read and pre-processing carried out 501 including checking syntax and creating a list of declared target servers.

Communications threads are spawned 502 for each target server. Message queues are created between the rules file processing thread and each communications thread.

The next incoming event data or exit condition is waited for 503. Any flush acknowledge messages are received 504 from communications threads.

Incoming raw event data is received 505 and the event data is parsed 506 using the rules file. Each time the generate event command is encountered, a processed event data message is placed 507 on the queue to the appropriate communications thread. If the main event is not discarded, a processed event data message is placed 508 on the queue to the appropriate communications thread.

It is determined 509 if the maximum number of buffered events has been reached. If not, the method loops to wait for the next incoming event data or exit conditions 503.

If the maximum number of buffered events is reached, it is determined 510 if a previous flush was sent out and acknowledged by all the communications threads. If not, the flush acknowledgements are awaited 511. If so flush commands are sent 512 to all communication threads and the method loops to wait for the next incoming event data or exit conditions 503.

Figure 6:
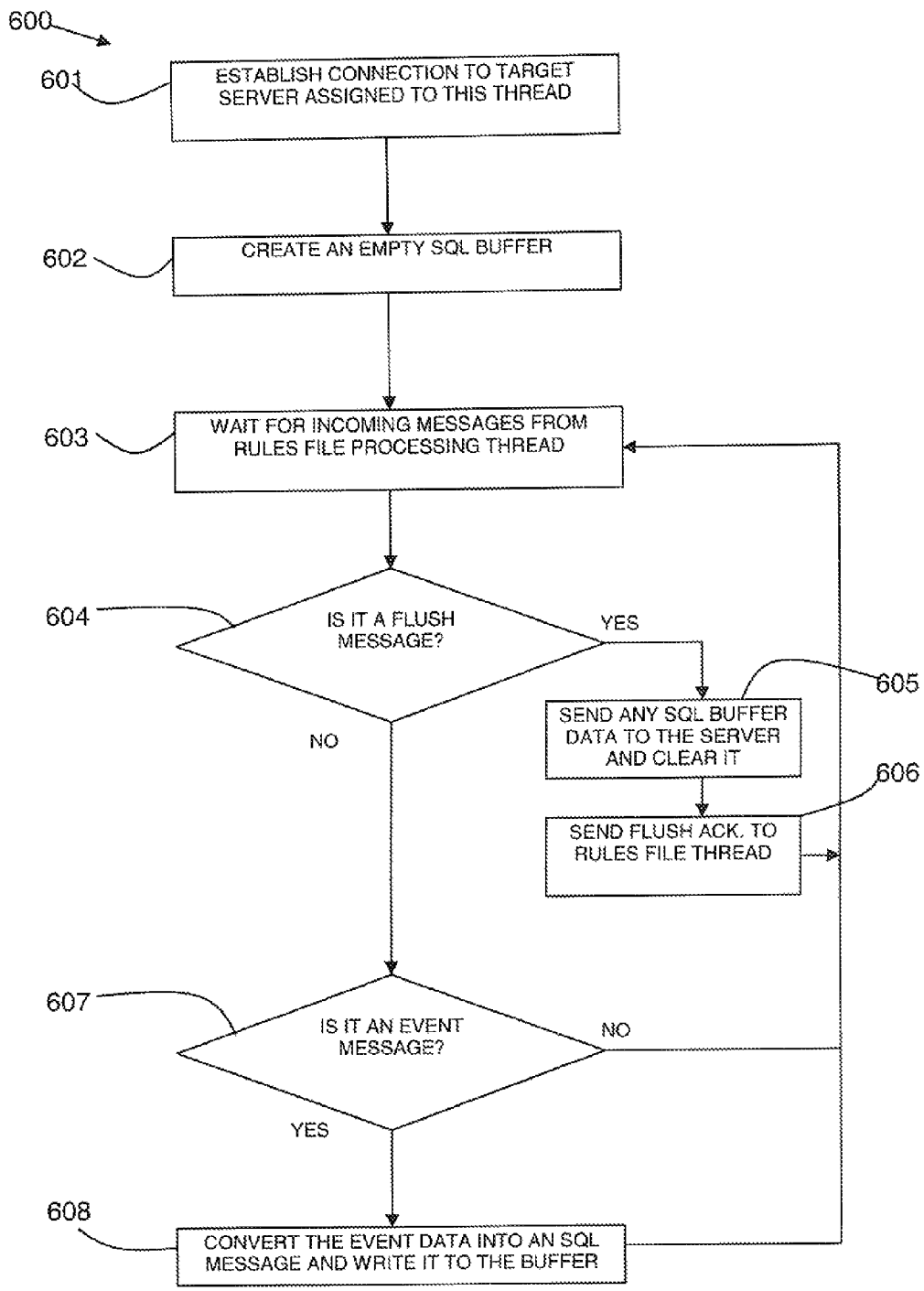
FIG. 6 is a flow diagram of a method of thread processing at a communications thread according to an embodiment of the present invention.

Referring to FIG. 6, a flow diagram 600 of a method at each communications thread is shown according to an embodiment of the invention. A connection is established 601 to a target server assigned to the communications thread. An empty SQL buffer is created 602.

Incoming messages are waited for 603 from the rules file processing thread. It is determined 604 if a message is a flush message. If so, any SQL buffer data is sent 605 to the server and cleared. Flush acknowledgement is sent 606 to the rules file thread and the method loops to wait for more incoming messages 603.

If the message is not a flush message, it is determined 607 if it is an event message. If not, the method loops to wait for more incoming messages 603. If it is an event message, the event data is converted 608 into an SQL message and written to the buffer. The method loops to wait for more incoming messages 603.

Thread Structure

In an embodiment of the invention, threads are created and destroyed using library thread functions. Inter-thread communication is asynchronous and handled using semaphore based message queues. The main library event processing loop processes the rules file and spawns one or more server communications threads. There is typically no direct communication between communications threads. The processing loop thread controls the communications thread(s). The communications threads will sleep when waiting for input data if they are not in the process of transmitting data. Data sent by the main processing thread is buffered if the communications thread is busy sending data and processed as soon at it is free to do so.

Inter-Thread Data Structure

In an embodiment of the invention, large amounts of data are not typically passed over the message queues, instead a shared data model is used.

In this embodiment, the process thread does not work through the rules files more than twice before it has to wait for all of the communications threads to transmit and store any pending data from the previous cycle.

Inter-Thread Message Structure

In an embodiment of the invention, the messages that can be passed between the process and communication threads are listed below:

"Event Data", from process thread to communication threads. The process thread has reached a generate event command in the rules file and is sending the referenced event data to the communications thread. Alternatively, the process thread has reached the end of the rules file and is sending the main event data to the appropriate communications thread.

"Flush", from process thread to all communications threads. The main monitoring device has called the flush command. This causes the process thread to send the flush command to all the communications threads. If there is any buffered data then the communications thread will send it to the server.

"Flush Ack", from communication thread to process thread. Indicates that the communications thread has completed flushing all pending data to the server. The processing thread waits for this before sending out another Flush message to this thread.

Initialization

In an embodiment of the invention, the initialization of a monitoring device includes a final stage which involves spawning communication threads. The rules file is processed to find each instance of register target command which is used to work out a list of required server connections. This produces one connection for each server regardless of the number of separate tables on each server. Connections to each server are then created. The column types for each target table are queried from the relevant servers and stored.

During the final stage, the inter-thread memory requirements are calculated from the rules file and memory allocated. The SQL buffer memory size is calculated from the rules file. A thread is spawned for each server connection and the control of the connection and buffer size is then passed to this thread. The number of threads will be one more than the number of servers the monitoring device connects to. So the number of threads spawned is controlled by the number of register target commands to different servers used in the rules file.

Processing

In an embodiment of the invention, the rules file is parsed when an input event occurs. When processing reaches a generate event command and transfers the data to the appropriate thread for marshalling and transmission via pointer. If the target table has a matching details table then any current details information is also passed to the appropriate thread for marshalling and transmission.

In one embodiment, the syntax of the generate event command may be:

"genevent(target, column_name1, data1, column_name2, data2, . . . )", where target is the target table returned by the register target command. The column name and data pairs correspond to the structure of the target table but can be a subset of all the columns available. The target and column names are literals but the data can be variables. Any type conversion of data required is performed at this stage. If a type conversion is not possible then a non-fatal error will be logged and the event will not be generated.

An alternative syntax of the generate event command may be:

"genevent(target)", where all of the current event data is duplicated and sent to the target table. This is so that for use cases where an administrator wishes to simply send an exact duplicate of the current event to more than one server, all of the column name and data pairs do not need to be reproduced. As this is likely to be one of the primary use cases, it should be easy for the administrator. At the end of processing the rules file, if a discard event operation was not invoked, then the event data will also be transmitted to the thread holding the connection to the currently selected target table. If this target table is flagged as having a matching describe table then any describe data is also passed to the appropriate thread for marshalling and transmission. When a network monitoring device instructs the library to send data using the flush command it will result in a send command being sent to all the transmission threads. If multiple details commands are included in the rules file, then it is the most recent one before the generate event command that takes precedence, assuming the target includes a details table. The details may then be changed again by another details command before the next generate event command or the end of the rules file is reached.

Marshalling

The data is passed to the communication thread as target and column name data pairs. These are converted into SQL and appended to a text buffer ready for transmission. The buffer is a memory allocated area of memory with a start and end pointer. The maximum buffer size required will be calculated during initialization and will be memory allocated by the transmission thread when it starts.

Transmission

If buffering is turned off, then the SQL text buffer is transmitted to the server as soon as it is marshaled. Send commands are ignored, apart from returning a flush acknowledge. If buffering is turned on then the SQL text buffer is transmitted to the server when the send command is received and then a flush acknowledge is returned.

To maintain and improve performance of the monitoring device, communication with each server is handled by separate threads. The network monitoring device will be able to receive an event and be transmitting the previous event results at the same time. This structure means that generate event inserts and standard event inserts to different servers could become slightly out of order. This multithreading can be disabled but is likely to reduce performance.

The scenario where the described threading structure is likely to improve performance is where the monitoring device is processing a large amount of event data but communication is not being held up significantly by the server because, for instance, it is running on a faster machine and is not being heavily loaded by other event feeds.

The described method and system have the following example applications.

Event flood detection, where an excessive level of input data is temporarily discarded and replaced by far fewer informational events. An administrator may wish to configure the monitoring device rules file to detect an event flood condition using the additional functionality provided and temporarily suppress event data being sent onto the server. The generate event command is used to send the server an informational event when the flood protection is activated and another when it is deactivated.

An administrator may require events to be divided into high priority processing events and low priority informational events at source and handle each in a different way. The high priority events are sent to a high priority server and to a server system that correlates and archives all events. The low priority events are only sent to the server that correlates and archives all events.

An administrator may require statistical analysis of incoming event data but does not want to increase the load on the server receiving the events. The generate event command is used to send statistical information derived from the incoming event data to another server for later analysis.

An administrator may wish to duplicate all event data in two or more servers without the overhead of running a unidirectional gateway between them. The data has different operations performed on it by different servers.

An event management system may be provided as a service to a customer over a network.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A method for processing network events, comprising:
   receiving an input network event from a monitoring device on a processing thread, wherein the input network event comprises event data;
   generating a plurality of data output events from the input network event, wherein the generating further comprises:
      parsing the event data using a rules file, wherein the rules file includes a plurality of generate event commands;
      for each generate event command in the rules file, placing the event data on one of a plurality of queues, wherein each of the plurality of queues is associated with a different one of a plurality of server databases;
      generating a plurality of communications threads, wherein each communications thread is used for transmitting one or more of the plurality of data output events to a corresponding one of the plurality of server databases, and wherein each of the communications threads is associated with a different one of the plurality of queues; and
      transmitting the event data, by each of the communications threads, to its corresponding server database.

2. The method as claimed in claim 1, wherein a first communications thread marshals and transmits the event data to a first server database.

3. The method as claimed in claim 1, wherein the communication threads open a plurality of connections to the plurality of server databases and further comprising maintaining the connections in an open state while the monitoring device is running.

4. The method as claimed in claim 1, further comprising:
   processing the rules file to find one or more instances of one or more registered targets; and
   determining one or more server database connections.

5. The method as claimed in claim 1, wherein the server databases include one or more tables for event data, and wherein each communications thread corresponds to one of the plurality of server databases.

6. The method as claimed in claim 1, wherein inter-thread communication is asynchronous via one or more message queues.

7. The method as claimed in claim 1, further comprising:
   transferring the event data via an inter-thread data structure.

8. The method as claimed in claim 1, further comprising:
   sending one or more flush commands from the processing thread to clear the communications threads.

9. The method as claimed in claim 1, wherein the transferring further comprises:
   transferring the event data via a pointer to a selected communications thread.

10. The method as claimed in claim 1, wherein the event data is converted into a structured query language (SQL) and appended to a text memory allocation for transmission.

11. A computer software product for processing network events, the product comprising a computer-readable storage device, in which a computer program comprising computer-executable instructions are stored, which instructions, when executed by a computer, perform the following steps:
   receiving an input network event from a monitoring device on a processing thread, wherein the input network event comprises event data;
   generating a plurality of data output events from the input network event, wherein the generating further comprises:
      parsing the event data using a rules file, wherein the rules file includes a plurality of generate event commands;
      for each generate event command in the rules file, placing the event data on one of a plurality of queues, wherein each of the plurality of queues is associated with a different one of a plurality of server databases;
      generating a plurality of communications threads, wherein each communications thread is used for transmitting one or more of the plurality of data output events to a corresponding one of the plurality of server databases, and wherein each of the communications threads is associated with a different one of the plurality of queues; and
      transmitting the event data, by each of the communications threads, to its corresponding server database.

12. The computer software product as claimed in claim 11, wherein a first communications thread marshals and transmits the event data to a first server database.

13. The computer software product as claimed in claim 11, wherein the communication threads open a plurality of connections to the plurality of server databases and further comprising maintaining the connections in an open state while the monitoring device is running.

14. The computer software product as claimed in claim 11, further comprising:
processing the rules file to find one or more instances of one or more registered targets; and
determining one or more server database connections.

15. The computer software product as claimed in claim 11, wherein the server databases include one or more tables for event data, and wherein each communications thread corresponds to one of the plurality of server databases.

16. The computer software product as claimed in claim 11, wherein inter-thread communication is asynchronous via one or more message queues.

17. The computer software product as claimed in claim 11, further comprising:
transferring the event data via an inter-thread data structure.

18. The computer software product as claimed in claim 11, further comprising:
sending one or more flush commands from the processing thread to clear the communications threads.

19. The computer software product as claimed in claim 11, wherein the transferring further comprises:
transferring the event data via a pointer to a selected communications thread.

20. The computer software product as claimed in claim 11, wherein the event data is converted into a structured query language (SQL) and appended to a text memory allocation for transmission.

21. A system for processing network events, comprising:
a network monitoring device for acquiring network event data;
a processing system for receiving an input network event from the monitoring device on a processing thread, wherein the input network event comprises event data, and generating a plurality of data output events from the input network event, wherein the generating further comprises:
parsing the event data using a rules file, wherein the rules file includes a plurality of generate event commands;
for each generate event command in the rules file, placing the event data on one of a plurality of queues, wherein each of the plurality of queues is associated with a different one of a plurality of server databases;
generating, by a communications thread generating component included in the processing system, a plurality of communications threads, wherein each communications thread is used for transmitting one or more of the plurality of data output events to a corresponding one of the plurality of server databases, and wherein each of the communications threads is associated with a different one of the plurality of queues; and
transmitting the event data, by each of the communications threads, to its corresponding server database.

22. The system as claimed in claim 21, wherein the processing system includes a receiver for the input network event.

23. The system as claimed in claim 21, wherein a first communications thread marshals and transmits the event data to a first server database.

24. The system as claimed in claim 21, wherein the communication threads open a plurality of connections to the plurality of server databases and wherein the plurality of connections are maintained in an open state while the monitoring device is running.

25. The system as claimed in claim 21, further comprising:
processing the rules file to find one or more instances of one or more registered targets; and
a component for determining one or more server database connections.

26. The system as claimed in claim 21, wherein the server databases include one or more tables for event data, and wherein each communications thread corresponds to one of the plurality of server databases.

27. The system as claimed in claim 21, wherein inter-thread communication is asynchronous via one or more message queues.

28. The system as claimed in claim 21, further comprising:
an inter-thread data structure for transferring the event data.

29. The system as claimed in claim 21, further comprising:
a component for flushing the communications threads.

30. The system as claimed in claim 21, further comprising a parsing component for parsing the event data to generate the plurality of data output events.

31. The system as claimed in claim 21, wherein the communications threads include a converter for converting the event data into structured query language (SQL) and appending it to a text memory allocation for transmission.

32. The system as claimed in claim 21, wherein the processing system runs on a plurality of processors enabling the processing thread and the communications threads to be executed simultaneously.

* * * * *